(12) United States Patent
Zeng et al.

(10) Patent No.: US 11,487,187 B2
(45) Date of Patent: Nov. 1, 2022

(54) CAMERA LENS SUPPORT SYSTEM

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 566 days.

(21) Appl. No.: 16/711,382

(22) Filed: Dec. 11, 2019

(65) Prior Publication Data

US 2021/0181601 A1 Jun. 17, 2021

(51) Int. Cl.
*G03B 17/12* (2021.01)
*G03B 17/56* (2021.01)

(52) U.S. Cl.
CPC ............ *G03B 17/12* (2013.01); *G03B 17/561* (2013.01)

(58) Field of Classification Search
CPC .... G03B 17/12; G03B 17/561; G03B 17/566; G03B 11/045; G03B 11/00; G03B 11/04
See application file for complete search history.

(56) References Cited

U.S. PATENT DOCUMENTS

| 11,137,668 | B2* | 10/2021 | Liwszyc | F16B 2/185 |
| 2007/0182930 | A1* | 8/2007 | Elias | G03B 17/561 |
| | | | | 352/243 |
| 2015/0288858 | A1* | 10/2015 | Fee | F16M 11/041 |
| | | | | 348/376 |
| 2019/0324353 | A1* | 10/2019 | Liwszyc | F16M 13/022 |
| 2021/0382373 | A1* | 12/2021 | Zeng | G02B 7/006 |

FOREIGN PATENT DOCUMENTS

WO    WO-2021046291 A1 *  3/2021  .............  G03B 11/00

* cited by examiner

*Primary Examiner* — Antoinette T Spinks
(74) *Attorney, Agent, or Firm* — Loza & Loza, LLP; Derek Yeung (57) ABSTRACT

A camera lens support system distributes the weight of a lens in a camera rig. The camera lens support system provides multiple degrees of freedom and adjustment to support a large number of lens and camera body combinations. The camera lens support system includes a locking mechanism that can simultaneously restrict translational and rotational adjustments of the camera lens support system.

16 Claims, 6 Drawing Sheets

SECTION A-A

CAMERA LENS SUPPORT SYSTEM

TECHNICAL FIELD

The present disclosure relates generally to a camera lens support system, and in particular, a camera lens support system with an improved locking mechanism and multiple degrees of freedom.

INTRODUCTION

A camera lens support system can be used to transfer or offload the weight of a camera lens from a lens mount of a camera. A lens mount is a mechanic interface between a camera body and a lens. In modern cameras, the lens mount also proves an electrical interface between the camera body and the lens. Therefore, it is desirable to prevent damage to a lens mount. In some applications, a camera rig can use a camera lens support system to distribute the weight of the camera rig to improve handling, especially when a large, telephoto, or long lens is used with the camera rig.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a camera lens support system that can distribute the weight of a lens in a camera rig. The camera lens support system provides multiple degrees of freedom and adjustment to support a large number of lens and camera body combinations. The camera lens support system includes a locking mechanism that can simultaneously restrict multiple degrees of freedom (e.g., translational and rotational adjustments) of the camera lens support system to facilitate quick adjustment and improve usability of the camera rig.

One aspect of the present disclosure provides an adjustable bracket for supporting a camera rig. The bracket includes a first bracket member that includes a lock, a first portion, and a second portion. The first portion and the second portion are restricted to move relative to each other in a translational motion, and the first portion is adapted to movably and rotatably connect with a rig rod included in the camera rig. The bracket further includes a second bracket member that includes a first end and a second end. The second end of the second bracket is rotatably connected with the second portion of the first bracket member, and the first end of the second bracket is adapted to support a lens. The lock is operable between an unlocked state and a locked state to restrict the translational motion between the first portion and the second portion of the first bracket member, and simultaneously restrict a relative motion between the first bracket member and the second bracket member.

Another aspect of the present disclosure provides a bracket for supporting a camera rig. The bracket includes a first bracket member adjustable in length and adapted to be connected to a camera rod of the camera rig. The bracket further includes a second bracket member that is removably and rotatably connected with the first bracket member. The second bracket is adapted to be connected to a matte box of the camera rig. The bracket further includes a locking mechanism adapted to simultaneously fix a length of the first bracket member and an angle between the first bracket member and the second bracket member. In one aspect, the first bracket member includes a first portion and a second portion that is slidably connected with the first portion. In one aspect, the locking mechanism is adapted to simultaneously deform the first portion and the second portion to restrict a translational motion between the first portion and the second portion. In one aspect, the locking mechanism is adapted to control a diameter of a first cylindrical opening formed at a first end of the first bracket member, and simultaneously control a diameter of a second cylindrical opening formed at a second end, opposite the first end, of the first bracket member.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Aspects of the present disclosure provide a camera lens support system that can distribute the weight of a lens included in a camera rig. The camera lens support system includes a mechanism that provides multiple degrees of freedom and adjustment to support a large number of lens and camera body combinations. The camera lens support system can support a lens via a matte box that is connected to the lens.

Figure 1:
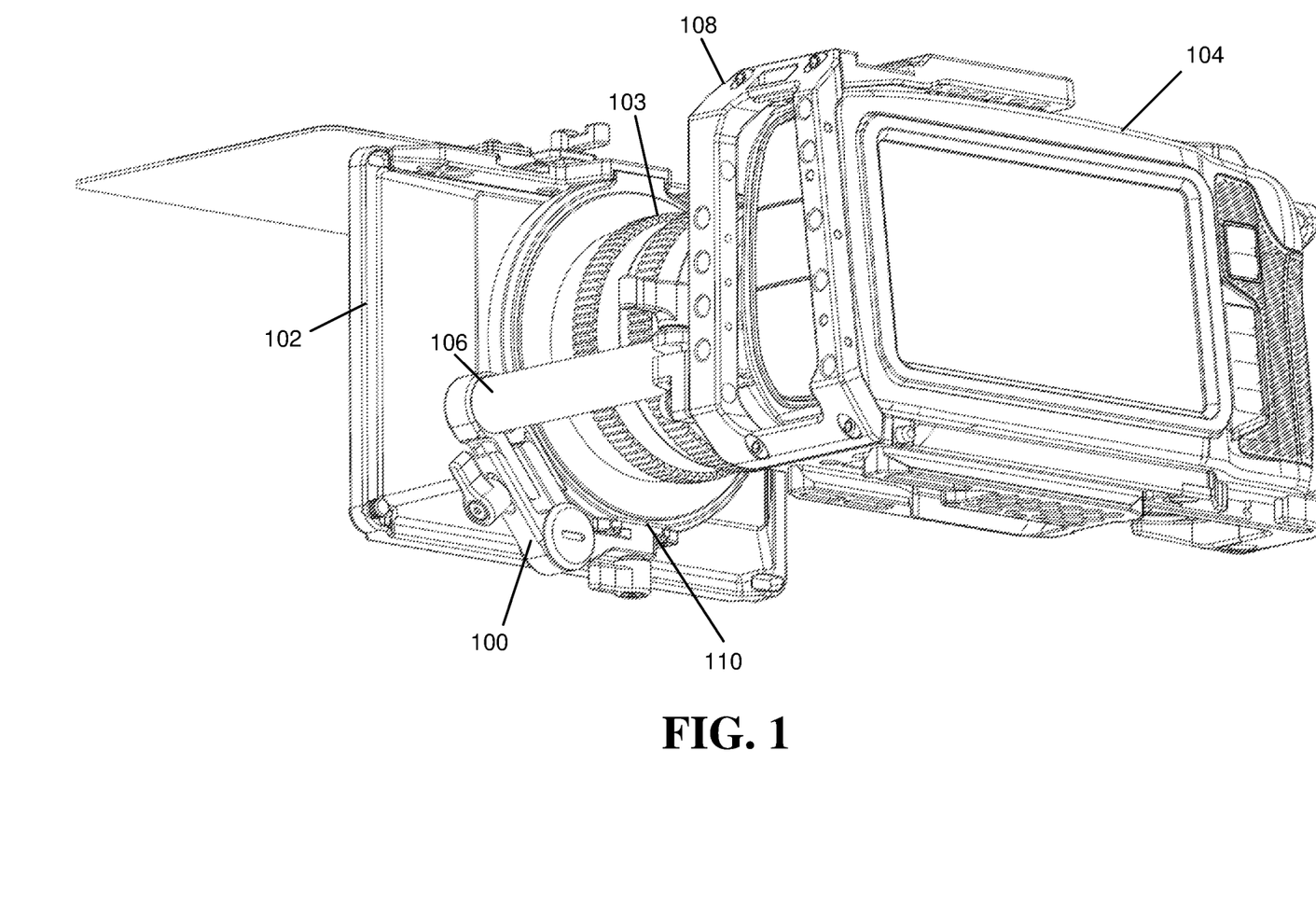
FIG. 1 is a drawing illustrating a first exemplary camera rig including a camera lens support system according to an embodiment.
Figure 2:
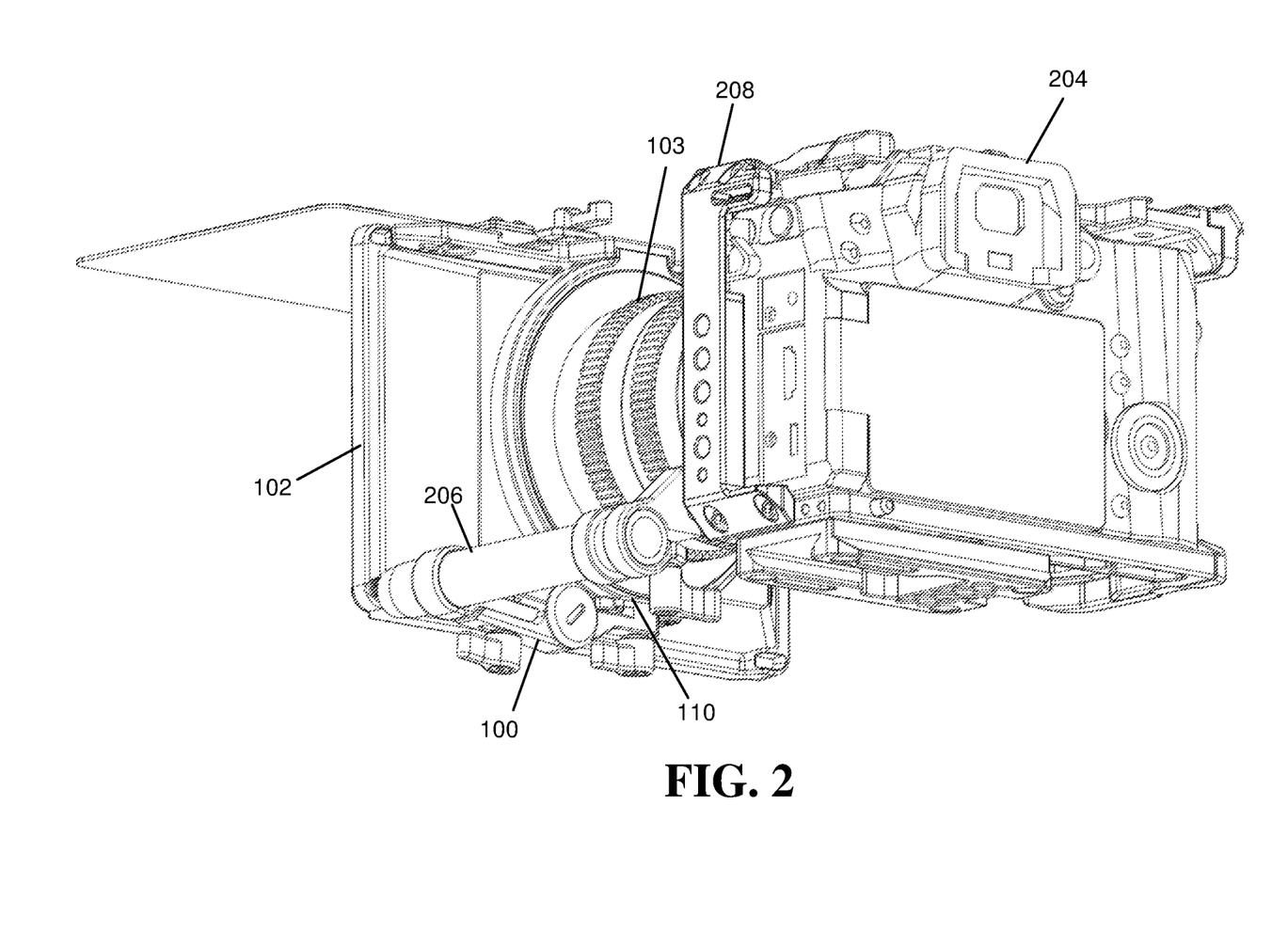
FIG. 2 is a drawing illustrating a second exemplary camera rig including the camera lens support system according to an embodiment.

Referring now to the drawings, the lens support system includes a bracket 100 that provides support to a lens in a camera rig that includes a matte box 102, a lens 103, and a camera body (e.g., camera bodies 104 and 204 shown in FIGS. 1 and 2). The bracket 100 is removably connected between the camera matte box and a camera rig rod (e.g., rods 106 and 206 shown in FIGS. 1 and 2) of the camera rig. The matte box 102 is removably attached to a front portion of the lens 103 that is removably connected to a lens mount of the camera body. Specifically, the bracket 100 has multiple degrees of freedom (e.g., a translational direction and a rotational direction) such that the bracket 100 can be adjusted to connect the matte box 102 with the camera rig rod in various positions. After the bracket 100 is connected between the matte box and the camera rig rod, the bracket 100 can be locked down to prevent further movement such that the bracket 100 can distribute the weight of the matte box and lens throughout the rig. For example, the bracket 100 is adjustable in length in a translational direction, and can angulate to connect the camera rig rod with the matte box.

Figures 3, 4:
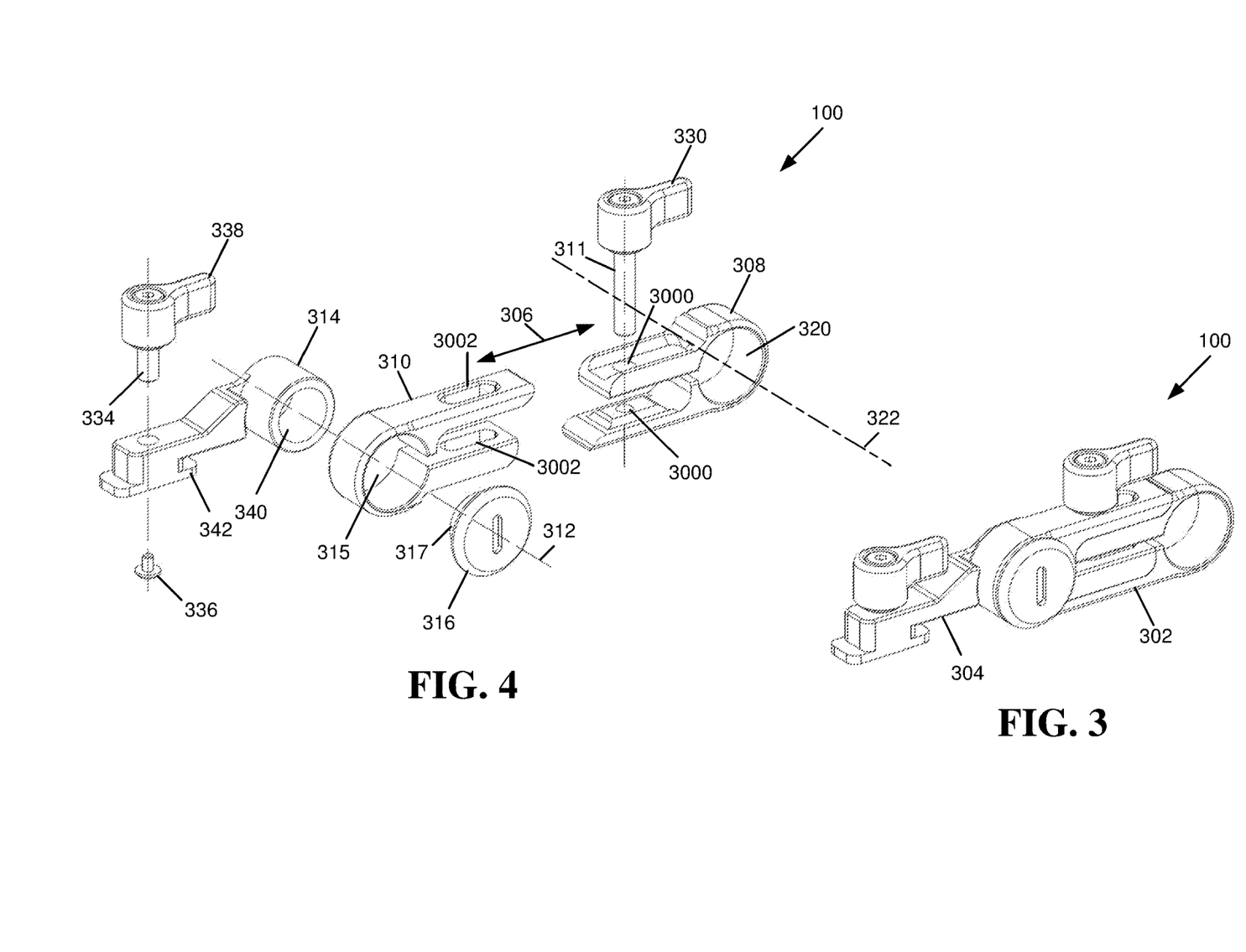
FIG. 3 is a drawing illustrating an assembled view of the camera lens support system according to an embodiment.
FIG. 4 is a drawing illustrating an exploded view of the camera lens support system of FIG. 3.

In one embodiment, referring to FIGS. 3 and 4, the bracket 100 includes a first part 302 (first bracket member) and a second part 304 (second bracket member) that is moveably and rotatably attached to the first part 302. The first part 302 may include two portions that are movably coupled to each other to form a joint (e.g., prismatic joint) that allows a linear, translational, or telescopic movement to adjust a length of the first part 302 in a predetermined linear direction 306. In one embodiment, the first part 302 and the second part 304 are rotatably coupled together (e.g., by a revolute joint, a pin joint, or hinge joint) with a rotational axis 312 that is substantially perpendicular to the sliding direction 306 of the bracket.

In one embodiment, the first part 302 may include a first slider 308 and a second slider 310. The first slider 308 and the second slider 310 have complementary shapes such that they can slidably interlock to form a prismatic joint or the like that allows movement along a single direction (e.g., direction 306). For example, referring to FIG. 5, the first slider 308 has a protrusion 350 that overlaps with a recessed portion 352 of the second slider 310; and the second sider 310 has a protrusion 354 that overlaps with a recessed portion 356 of the first slider 308. That is, the prismatic joint restricts the relative movement between the first slider 308 and the second slider 310 to a linear or translational direction. Moreover, the first slider 308 and the second slider 310 may be fastened or fixed together to prevent their relative movement using a locking mechanism. For example, a locking mechanism includes a shaft 311 that passes through holes 3000 on the first slider 308 and corresponding slots 3002 on the second slider 310. The shaft 311 is rotatable and vertically displaceable in the holes 3000 and slots 3002. One end of the shaft 311 is connected to a hand knob 330, and an opposite end of the shaft 311 may threadedly engage at least one of the holes 3000. When a user operates the hand knob 330, the hand knob 330 and the shaft 311 may engage, push, or urge the first and second sliders to compress them together or release them to allow movement and adjustment.

Figure 5:
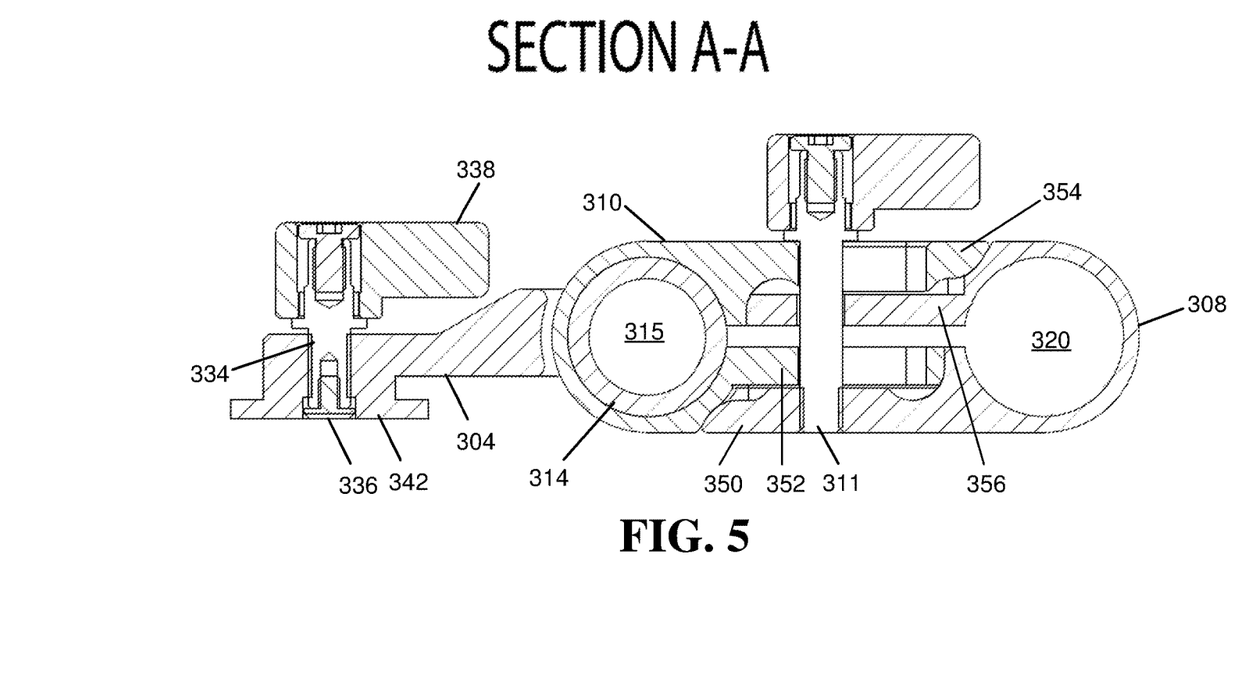
FIG. 5 is a drawing illustrating a cross-sectional view of the camera lens support system of FIG. 3.

When the shaft 311 is set in an unlocked position (e.g., turning the hand knob 330 in a counterclockwise direction), the first slider 308 and the second slider 310 can move freely relative to each other in a translational motion (e.g., telescopic or sliding). In addition, when the shaft 311 is set in the unlocked position, the first part 302 can freely rotate with respect to the second part 304 about the axis 312 (axial axis). Furthermore, when the shaft 311 is set in the unlocked position, a camera rig rod (e.g., rod 106 or 206) can move freely (rotationally and translationally along an axis 322) inside a cylindrical opening 320 of the first part 302. When the shaft 311 is set in a locked position (e.g., turning the hand knob 330 in a clockwise direction), the shaft 311 and/or hand knob 330 increases the fraction between the mating surfaces of the interlocking first and second sliders 308 and 310 to prevent any movement between the sliders. Also, when the shaft 311 is set in a locked position, the shaft 311 and/or hand knob 330 can cause a decrease of the internal diameter of the cylindrical opening 315 so as to prevent a rotational movement between the first part 302 and the second part 304. In addition, when the shaft 311 is set in the locked position, the shaft 311 and/or hand knob 330 can cause a decrease of the internal diameter of the cylindrical opening 320 so as to prevent a camera rig rod from moving (e.g., rotational and/or translational motion) inside the opening 320. That is, the locking mechanism (e.g., shaft 311 and hand knob 330) can lock down a configuration of the bracket 100 by a single locking action (e.g., turning the hand knob 330). In some examples, in the locked position, the locking mechanism can cause the first slider 308 and second slider 310 to slightly deform to simultaneously apply sufficient pressure to fix the camera rig rod and a pin portion 314 (rotating portion) inside the respective cylindrical openings. Other means of securing and locking the first slider 308 and second slider 310 are also contemplated in this disclosure.

In one embodiment, the revolute joint between the first part 302 and the second part 304 is formed by a pin portion 314, a cylindrical opening 315 at one end of the second slider 310, and a cap 316. At least a part of the pin portion 314 extends into the cylindrical opening 315 such that the pin portion 314 and the cylindrical opening 315 are concentrically located. The external circumference of the pin portion 314 is suitably smaller than the internal circumference of the opening 315 to the extent needed to facilitate a tight or snug fit. The cap 316 is securely fastened to an end of the pin portion 314 to prevent it from sliding out from the opening 340 while allowing the pin portion 314 to rotate in the opening 315. In one example, the cap 316 may have an extension 317 that can be removably coupled to an internal opening 340 by an interference fit (e.g., press fit and friction fit). The pin portion 314 may be inserted into the cylindrical opening 315 from either side of the second sider 310.

The second part 304 has a connector 342 extending from an edge of the pin portion 314. The connector 342 is adapted to connect with the attachment point 110 on the matte box 102. In one embodiment, the attachment point 110 may be an accessory shoe (e.g., cold shoe), and the connector 342 can slide into the accessory shoe (i.e., attachment point 110) for a secure connection. A locking mechanism, including a pin 334, a retainer 336, and a hand knob 338, can removably fasten the connector 342 to the attachment point 110. The retainer 336 prevents the pin 334 from sliding out from the connector 342. A user can turn the hand knob 338 in a clockwise direction to secure the connector 342 with the attachment point 110, and turn the hand knob 338 in a counterclockwise direction to loosen the connector 342 from the attachment point 110. Other means for removably connecting the second part 304 to the matte box 102 are also contemplated in this disclosure.

An exemplary operating procedure is described below for installing the bracket 100 to a camera rig. The camera rig may be similar to those described above in relation to FIGS. 1 and 2. A user may operate the hand knobs 330 and 338 to set the bracket 100 in an adjustable state in which the first part 302 and the second part 304 may freely rotate against each other, and the first slider 308 and the second slider 310 may freely move relative to each other in a translational motion. With the bracket 100 set in the adjustable state, the user can insert a camera rig rod (e.g., rod 106 or 206) into the cylindrical opening 320 of the bracket 100. Then, the user can slide the bracket 100 along the rod to adjust the position of the bracket 100 such that the connector 342 can be connected to the attachment point 110 on the matte box 102. After the connector 342 connects with the attachment point 110, the user can operate the hand knob 338 to secure the connection between the connector 342 and the attachment point 110 such that the connector 342 is securely attached to the attachment point 110. Then, the user can operate the hand knob 330 to set the bracket 100 in a locked state in which the first part 302 and the second part 304 cannot freely rotate against each other, and the first slider 308 and the second slider 310 cannot freely move relative to each other. In the locked state, the bracket 100 has zero degrees of freedom and can distribute the weight of the lens/matte box across the camera rig via the bracket 1000. Other procedures for operating the bracket 100 are also contemplated in this disclosure.

Figure 6:
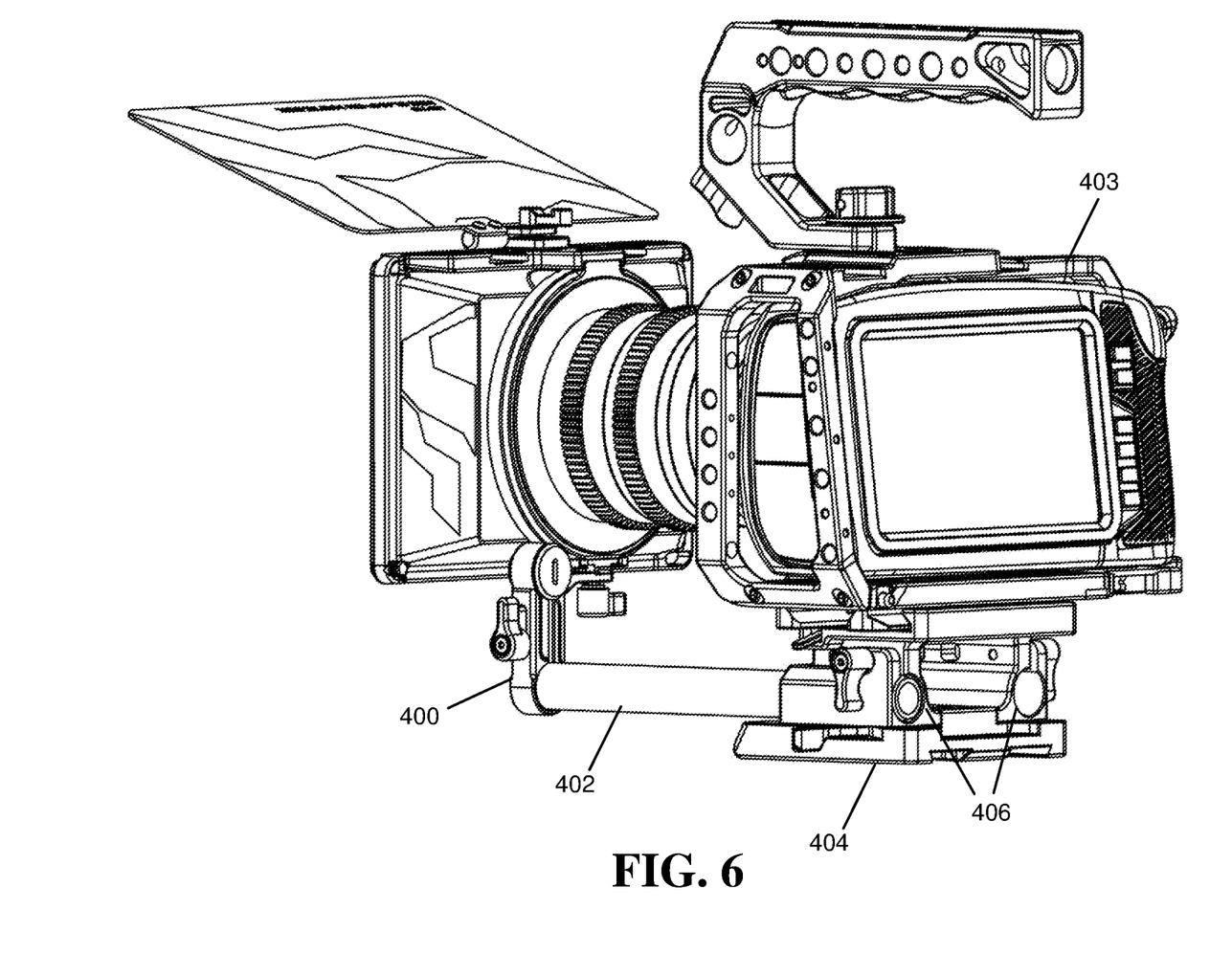
FIG. 6 is a drawing illustrating a third exemplary camera rig including a camera lens support system according to an embodiment.
Figure 7:
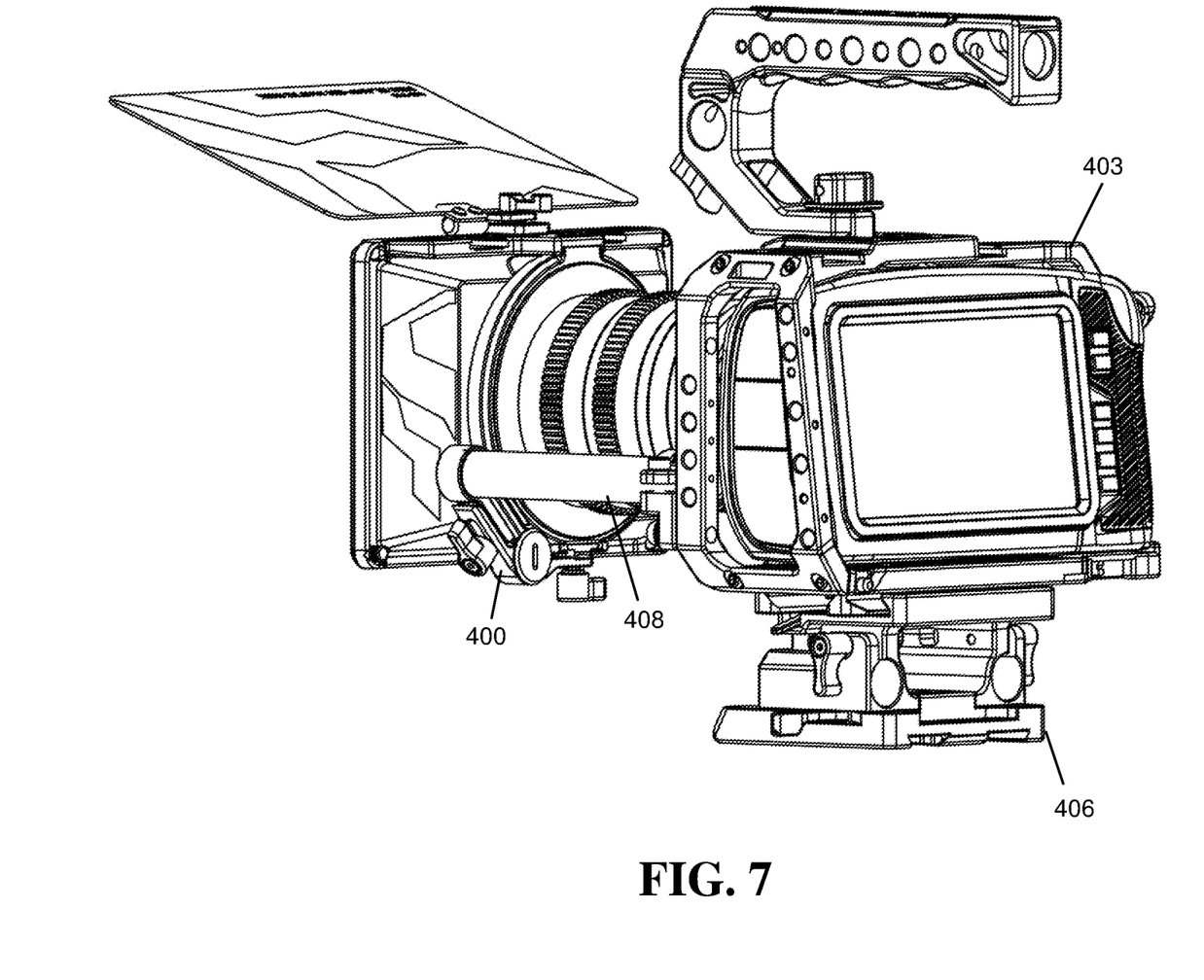
FIG. 7 is a drawing illustrating a fourth exemplary camera rig including a camera lens support system according to an embodiment.

FIGS. 6 and 7 are drawings illustrating additional exemplary camera rigs according to various embodiments. In FIG. 6, a bracket 400 is connected with a rig rod 402 that is connected to a base (e.g., baseplate 404) under a cage 403. The bracket 400 may be the same as the bracket 100 described above in relation to FIGS. 1-5. In one example, the baseplate 404 has a support rod clamp 406 that secures a pair of rods (e.g., rig rod 402). In FIG. 6, the bracket 400 may be connected to a rob 408 that is secured to the cage.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An adjustable bracket for supporting a camera rig, the bracket comprising:
    a first bracket member comprising a lock, a first portion, and a second portion, the first portion and the second portion restricted to move relative to each other in a translational motion, the first portion adapted to movably and rotatably connect with a rig rod included in the camera rig; and
    a second bracket member comprising a first end and a second end, the second end rotatably connected with the second portion of the first bracket member, the first end adapted to support a lens,
    wherein the lock is operable between an unlocked state and a locked state to restrict the translational motion between the first portion and the second portion of the first bracket member, and simultaneously restrict a relative motion between the first bracket member and the second bracket member.

2. The bracket of claim 1, wherein the first portion and the second portion are interlocking to form a prismatic joint.

3. The bracket of claim 2, wherein the prismatic joint comprises a slot joint.

4. The bracket of claim 1, wherein the first portion comprises a protrusion slidably engaging a recessed portion of the second portion.

5. The bracket of claim 4, wherein the first portion further comprises a first cylindrical opening adapted to receive the rig rod.

6. The bracket of claim 5, wherein the second portion comprises a second cylindrical opening having an axial axis parallel to an axial axis of the first cylindrical opening.

7. The bracket of claim 6, wherein the second bracket member comprises a rotating portion at the second end, the rotating portion removably and rotatably received in the second cylindrical opening.

8. The bracket of claim 7, wherein an axial axis of the rotating portion is parallel to the axial axis of the first cylindrical opening.

9. The bracket of claim 1, wherein the second bracket member comprises a connector at the first end, the connector adapted to removably and slidably connect with a matte box that is connected to the lens.

10. The bracket of claim 1, wherein the lock, in the locked state, is adapted to increase friction between matting surfaces of the first portion and the second portion of the first bracket member.

11. The bracket of claim 10, wherein the lock, in the locked state, is further adapted to prevent the second bracket member from rotating against the first bracket member.

12. The bracket of claim 1, wherein the first bracket member comprises a first cylindrical opening with a first axial axis, and the second bracket member comprises a second cylindrical opening with a second axial axis that is parallel to the first axial axis.

13. A bracket for supporting a camera rig, the bracket comprising:
   a first bracket member adjustable in length and adapted to be connected to a camera rod of the camera rig;
   a second bracket member removably and rotatably connected with the first bracket member and adapted to be connected to a matte box of the camera rig; and
   a locking mechanism adapted to simultaneously fix a length of the first bracket member and an angle between the first bracket member and the second bracket member.

14. The bracket of claim 13, wherein the first bracket member comprises a first portion and a second portion that is slidably connected with the first portion.

15. The bracket of claim 14, wherein the locking mechanism is adapted to simultaneously deform the first portion and the second portion to restrict a translational motion between the first portion and the second portion.

16. The bracket of claim 15, wherein the locking mechanism is adapted to control a diameter of a first cylindrical opening formed at a first end of the first bracket member, and simultaneously control a diameter of a second cylindrical opening formed at a second end, opposite the first end, of the first bracket member.

* * * * *